Patented Jan. 4, 1944

2,338,149

UNITED STATES PATENT OFFICE 2,338,149

COMBINED STAIN AND FILLER AND PROCESS OF MAKING

Robert F. Walker, Cleveland, and Henry W. Gutschmidt, Jr., and Wilbur A. Shope, Olmsted Falls, Ohio, assignors to The Glidden Company, Cleveland, Ohio, a corporation of Ohio No Drawing. Application January 23, 1942, Serial No. 427,924

21 Claims. (Cl. 106—34)

The present invention relates to a combined wood filler and stain and similar compositions useful in wood finishing.

Stains used in the staining of wood are generally of three types: (1) water stains, (2) oil stains, and (3) spirit stains. Water stains possess by far the best staining qualities but have the disadvantage of raising the grain. Many attempts to overcome this grain raising have been made and the use of organic solvents such as glycol ethers, glycerol, etc., for the water soluble dyes has been somewhat successful, particularly where great depth of color is not necessary. In the case of mahogany stains, however, high dye concentrations are necessary.

In using water stains, such as mahogany stains in wool finishing it is customary to first apply the stain, then a wash coat of shellac, or equivalent resin, followed by sanding and to thereafter apply an oil filler. These oil fillers contain substantial quantities of bulky pigments such as asbestos, silica, gypsum, etc., together with some coloring pigments to produce the proper color in the filler, depending upon the particular color of the stain used.

Attempts have been made to provide combined filler and stains whereby the three above mentioned operations may be reduced to a single application of the combined filler and stain. On lighter colors such as walnut and oak this has been somewhat successful but it has long been the hope of all stain and filler manufacturers to produce a combined mahogany stain and filler. Heretofore it has not been possible to produce such a product having satisfactory staining properties.

It is, therefore, an object of this invention to provide an improved combined stain and filler and particularly a combined mahogany stain and filler.

A further object is to provide an improved combined water stain and oil base filler.

Another object is to provide an improved process for making a combined filler and stain.

Other objects will be apparent from the description as it proceeds.

It has been found that the objects of the present invention may be accomplished if a uniform paste of the water soluble dyes in excess is first formed and this paste is then mixed with an oil base filler together with oleic acid, or equivalent oil miscible wetting agent for the dye, triethanolamine, or equivalent water soluble organic emulsifying agent which is a solvent for the dye and a small amount of water. By "excess" of dye is meant an amount in excess of that which is in solution in the organic solvent and water.

It is believed that the improved staining is due in considerable part to the uniform dispersion of the dyes so that upon wiping in the usual manner the staining is produced. Some staining, of course, is caused by dye in solution in both the organic solvent and the water, and within limits the more water employed the greater is the depth of color produced. By the expedients of the present invention, however, a stable dispersion is produced in which the dye is dispersed both in solution and as a pigment. However, the dye dispersed as a pigment is capable of producing staining action which staining has the depth of color and permanence produced by an ordinary water stain. However, it does not result in raising of the grain.

Various procedural expedients may be employed in incorporating the various ingredients together, it being important, however, that thorough dispersion of the dye occur. This is best accomplished by forming a paste of the dye. One method of accomplishing this is to grind the dyes in oil together with the oleic acid and triethanolamine and then mix the resulting paste with an oil base filler and a small amount of water.

It is desirable to incorporate as much water as possible without causing a breaking of the mixture. The amount of water used will, therefore, depend somewhat upon the amount of emulsifying agent used in dispersing the dyes. The amount of water may also be increased somewhat by employing ammoniated water.

The amount of water may be further increased by preparing a stable emulsion of thinner and water containing additional oleic acid and triethanolamine. When the dye is dispersed in oil this emulsion is added to the mixture after mixing of the dye dispersion and filler paste, after which further water may be incorporated if desired. Additional thinner may also be added, if desired, after the water is incorporated. By first incorporating the emulsion in the mixture, the water is more easily taken up by the composition and the tendency of the filler to kick out is reduced.

Another method which may be employed is to first prepare a paste of the water soluble dye with water. This paste, together with the oils, filler pigments and an emulsion formed of thinner and water containing the wetting and emulsifying agents may then all be ground together in a suitable mixing device. Driers and additional thinners may then be added.

It is customary to make fillers in paste form and then dilute them to a liquid consistency with diluents and thinners. V. M. & P. naphtha and similar petroleum thinners are customarily employed and are preferred in the trade. Consequently it is necessary that the organic solvent employed be one which is miscible with this type of thinner when such are employed. The glycol ethers, such as di-ethylene glycol ethyl ether and ethylene glycol ethyl ether are not miscible with V. M. & P. naphtha and consequently these ethers cannot be employed with such diluents.

Triethanolamine, however, is miscible with the petroleum thinners and the present invention provides a combined filler and stain which can be thinned with these highly desirable thinners. When using triethanolamine, therefore, it is not necessary to use special solvents but the desired fluidity can be obtained with the ordinary thinners.

In order that those skilled in the art may more fully comprehend the invention the following detailed examples are given by way of illustration:

EXAMPLE 1

(A) Dye dispersion

| | | |
|---|---|---|
| Treated linseed oil | pints | 8 |
| Oleic acid | do | ½ |
| Triethanolamine | liquid ounces | 1½ |
| Sodium salt of benzene-azo-benzene azo-B. naphthol 6-8 sulfonic acid (Amacid Brilliant Croceine 3BA Conc.) | pounds | 8 |

The treated linseed oil was one which had been treated to improve its drying qualities. The oils, dye, oleic acid and triethanolamine were all ground together to form a paste.

A similar orange paste was also made using the sodium salt of p-sulpho-benzene-azo-B naphthol in place of the red dye above.

(B) Emulsion

| | | |
|---|---|---|
| V. M. & P. naphtha | pints | 2½ |
| Oleic acid | do | 1 |
| Triethanolamine | liquid ounces | 4 |
| Ammoniated water | pints | 4½ |

The naphtha and oleic acid are mixed together and this is then emulsified with the water containing the triethanolamine dissolved therein.

(C) Filler

An ordinary oil base filler is made up containing the following ingredients

| | | |
|---|---|---|
| Gypsum | pounds | ½ |
| Asbestine pulp | do | ¾ |
| Silica | do | 1½ |
| Drop black | ounces | 1½ |
| Carbon black | do | 1/16 |
| Amaranth lake | do | 2 |
| Burnt sienna | do | 3 |
| Treated linseed oil | liquid ounces | 2 |
| Raw linseed oil | ounces | 7 |
| Wood filler Japan | liquid ounces | 1½ |
| Pb and Mn drier | do | 1½ |

3 oz. by weight of each of the red and orange dye dispersions (A) may then be mixed with the filler in a dough mixer and after the dye is thoroughly mixed in there is added one ounce to the quart of the emulsion (B). While mixing there is also added 1½ ounces of ammoniated water, and after the water is in there is added 5 ounces of a mixture of equal parts of V. M. & P. naphtha and heavy naphtha. The resulting paste may then be reduced with one gallon of V. M. & P. naphtha per 10 pounds of paste to provide a liquid composition suitable for application.

EXAMPLE 2

| | | |
|---|---|---|
| Treated linseed oil | liquid ounces | 2¼ |
| Raw linseed oil | do | 7⅞ |
| Emulsion | do | 1¾ |
| Ammoniated water | do | 3 |
| Water soluble dye (red) | ounce | 1 |
| Water soluble dye (orange) | do | 1 |
| Wood filler Japan | liquid ounces | 1¾ |
| Pb and Mn drier | do | 1¾ |
| Drop black | ounces | ½ |
| Carbon black | do | 1/16 |
| Amaranth lake | do | 2 |
| Burnt sienna | do | 3 |
| Gypsum | pounds | ½ |
| Asbestine pulp | do | ¾ |
| Silica | do | 1½ |
| V. M. & P. naphtha | liquid ounces | 2 |
| Heavy naphtha | do | 5 |

The emulsion was the same as given in Example 1 as were the red and orange dyes. The dyes and the water were made into a paste by mixing and warming. The cooled paste, the oils and pigments were then all mixed in a dough mixer. After mixing was complete the driers and thinners were added to form the final paste.

It will be appreciated that various changes and modifications may be made from the above without departing from the spirit of the invention. The amounts of water may vary so long as no disruption of the mixture occurs. Within such limits the more water that is used the greater is the depth of color. It is preferred to use between 2 and 12 ounces of water to the gallon of paste. The amount of naphtha also effects the depth of color.

Of course other drying oils may be used. The particular combination of oils described has been found to give a proper drying time but any other drying oil or combination of drying oils may be used which provide suitable drying times depending on the particular requirements of the user. Other dyes may also be used as well as other pigments. Equivalent emulsifiers and wetting agents may also be used. However, as it is desirable to use naphtha as a thinner the emulsifying agent preferably is one which is compatible with V. M. & P. naphtha.

The combined filler and stain produced in accordance with the present invention has many advantages. In filling quality it is equal to any of the prior art fillers. In staining it far exceeds anything heretofore produced except regular water stains. There is a vast improvement in settling, it being practically non-settling in the package. This non-settling property alone is highly desirable and this with the deep rich colors constitute an important advance over regular fillers. The clarity and depth, heretofore only obtained by water staining and then filling, lowers the finisher's costs as only one operation is now necessary whereas heretofore he stained, shellacked, sanded and then filled. Now he need only fill and then apply the finishing coats.

Many of the advantages of the present invention are also found when applied to so-called pigment wiping stains. The color is not only intensified but the finisher can obtain a two operation job in one operation. He obtains the undertone of the water soluble dye present plus the top tone of the colored pigments present which acts as a sort of a glaze over the water stain producing a soft rich appearance. The product is also greatly improved in settling quality, it being easy to overcome any settling which does occur by agitating the wiping stain back to a workable condition.

Similarly in the glazes not only are the settling properties improved but the colors are so intensified that less pigment color bases are needed for the same depth of color. This results in a product of lower cost, one having less body, meaning less waste for the finisher, and one having better working qualities.

As indicated acceptable pigment wiping stains, glazes and the lighter colored combined filler and stains have been made. The present invention is valuable in improving this class of products but its greatest utility is found in the case of a combined mahogany stain and filler. It has heretofore been impossible to produce a satisfactory product of this character which could be reduced with ordinary thinners such as V. M. & P. naphtha. By using the product of the present invention the wood finisher need not depart from his ordinary practice in applying a filler, and at the same time he eliminates the expensive and time-consuming operations of staining, shellacking and sanding. Thus the invention not only constitues an improvement in the general types of wood finishing materials in which a water soluble dye is employed with an oil-pigment dispersion, but for the first time there is produced a satisfactory combined mahogany stain and oil-base filler.

Having described the invention what is claimed is:

1. A composition of matter suitable for use in wood finishing comprising an intimate stable mixture of (1) an intimate dispersion of water soluble dye in a drying oil containing an oil soluble wetting agent for the dye and a water soluble organic emulsifying agent which is a solvent for the dyes and is compatible with V. M. & P. naphtha, (2) a drying oil-pigment dispersion and water, the amount of water soluble dye being in excess of that which is in solution in the organic emulsifying agent and the water.

2. A combined wood filler and stain comprising an intimate, stable, mixture of (1) an intimate dispersion of water soluble dye in drying oil containing an oil soluble wetting agent for the dyes and a water-soluble organic emulsifying agent which is a solvent for the dye and is compatible with V. M. & P. naphtha, (2) a drying oil-pigment wood filler, and water, the amount of water soluble dye being in excess of that which is in solution in the organic emulsifying agent and the water.

3. A composition of matter suitable for use in wood finishing comprising an intimate stable mixture of (1) an intimate dispersion of water soluble dye in a drying oil containing oleic acid and triethanolamine, (2) a drying oil-pigment dispersion, and water, the amount of water soluble dye being in excess of that which is in solution in the triethanolamine and the water.

4. A combined wood stain and filler comprising an intimate stable mixture of (1) an intimate dispersion of water soluble dyes in a drying oil containing oleic acid and triethanolamine, (2) a drying oil-pigment wood filler, and water, the amount of said dyes being in excess of that which is in solution in the triethanolamine and the water.

5. A combined wood filler and stain paste comprising an intimate stable mixture of (1) an intimate dispersion of water soluble dye in drying oil containing oleic acid and triethanolamine, (2) a drying oil-pigment wood filler, and water in an amount from about 2 to 12 ounces per gallon of paste, the amount of water soluble dye being in excess of that which is in solution in the triethanolamine and the water.

6. The process of producing a composition suitable for use in wood finishing which comprises preparing an anhydrous intimate dispersion of water soluble dye in drying oil containing an oil soluble wetting agent for the dye and a water soluble organic emulsifying agent which is a solvent for the dye and is compatible with V. M. & P. naphtha, mixing said anhydrous dye dispersion with a drying oil dispersion, and incorporating water in said mixture to produce an intimate stable composition the amount of water soluble dye being in excess of that which is in solution in the organic emulsifying agent and in the water.

7. The process of preparing a combined wood filler and stain which comprises preparing an anhydrous intimate dispersion of a water soluble dye in drying oil containing an oil soluble wetting agent for the dye and a water soluble organic emulsifying agent which is a solvent for the dye and is compatible with V. M. & P. naphtha, mixing said anhydrous dye dispersion with a drying oil-pigment wood filler, and incorporating water in said mixture to produce an intimate stable composition, the amount of water soluble dye being in excess of that which is in solution in said organic emulsifying agent and the water.

8. The process of producing a combined wood filler and stain which comprises preparing an anhydrous dispersion of a water soluble dye in drying oil containing oleic acid and triethanolamine, mixing said dye dispersion with a drying oil-pigment wood filler, and incorporating water in said mixture to form an intimate stable composition, the amount of water soluble dye being in excess of that which is in solution in the triethanolamine and the water.

9. The process of producing a combined wood filler and stain paste which comprises preparing an anhydrous dispersion of a water soluble dye in a drying oil containing oleic acid and triethanolamine, mixing said dye dispersion with a drying oil-pigment wood filler, and incorporating water in said mixture to form an intimate stable composition the amount of water being about 2 to 8 ounces to the gallon of paste, and the amount of water soluble dye being in excess of that which is in solution in the triethanolamine and the water.

10. The process of producing a combined wood filler and stain which comprises preparing an anhydrous dispersion of water soluble dye in drying oil containing oleic acid and triethanolamine, mixing said dye dispersion with a drying oil-pigment wood filler, and thereafter uniformly incorporating a stable emulsion of water, V. M. & P. naphtha, oleic acid and triethanolamine, the amount of water soluble dye being in excess of that which is in solution in the triethanolamine and the water.

11. The process of producing a combined wood filler and stain which comprises preparing an anhydrous dispersion of water soluble dye in a drying oil containing oleic acid and triethanolamine, mixing said dye dispersion with a drying oil-pigment wood filler then uniformly incorporating a stable emulsion of water and V. M. & P. naphtha in said mixture, and thereafter adding additional water to produce an intimate stable composition, the amount of water soluble dye being in excess of that which is in solution in the triethanolamine and the water.

12. The process of preparing a composition suitable for use in wood finishing which comprises mixing an anhydrous intimate dispersion of water soluble dye in drying oil containing oleic acid and triethanolamine with a drying oil-pigment dispersion and incorporating water in said mixture to produce an intimate stable composition, the amount of water soluble dye being in excess of that which is in solution in the triethanolamine and the water.

13. The process of preparing a combined wood filler and stain which comprises mixing an anhydrous intimate dispersion of water soluble dye in drying oil containing oleic acid and triethanolamine with a drying oil-pigment filler, and incorporating water in said mixture to form an intimate stable composition, the amount of water soluble dye being in excess of that which is in solution in the triethanolamine and the water.

14. The proces of preparing a combined wood filler and stain which comprises mixing an anhydrous intimate dispersion of water soluble dye in drying oil containing oleic acid and triethanolamine with a drying oil-pigment wood filler, and then uniformly incorporating in said mixture an emulsion of water, V. M. & P. naphtha, oleic acid and triethanolamine, the amount of water soluble dye being in excess of that which is in solution in the triethanolamine and the water.

15. The process of producing a composition suitable for use in wood finishing which comprises mixing a uniform intimate anhydrous dispersion of water soluble dyes in drying oil containing a water soluble organic emulsifying agent which is a solvent for said dyes with a drying oil-pigment dispersion, and incorporating water in said mixture to produce an intimate stable composition, the amount of water soluble dye being in excess of that which is in solution in the organic emulsifying agent and in the water.

16. The process of producing a combined wood filler and stain containing as essential ingredients a water soluble dye, water, drying oil and filler pigments which comprises first forming a uniform paste of the water soluble dye with one of the above liquid ingredients, and thereafter thoroughly mixing the resulting paste with the remaining ingredients together with a small amount of an organic water soluble emulsifying agent which is a solvent for the dye and a small amount of an oil miscible wetting agent for the dye, the amount of water soluble dye being in excess of that which is in solution in the water and organic solvent for the dye.

17. The process of claim 16 in which the emulsifying agent is triethanolamine and the wetting agent is oleic acid.

18. The process of claim 16 in which the water is used to form the dye paste.

19. The process of claim 16 in which the water is used to form the dye paste, the emulsifying agent is triethanolamine and the wetting agent is oleic acid.

20. The process of producing a composition suitable for use in wood finishing comprising a water soluble dye, water, drying oil and inert pigments which comprises first forming a paste of the water soluble dye with water, and thereafter mixing the resulting paste with the drying oil and pigments together with a small amount of an organic water soluble emulsifying agent which is a solvent for the dye and a small amount of an oil miscible wetting agent for the dye, the amount of dye being in excess of that which is in solution in the water and organic solvent.

21. As a composition of matter suitable for use in wood finishing, an intimate dispersion comprising water soluble dye, water, drying oil, filler pigments, a small amount of an organic water soluble emulsifying agent which is a solvent for the dye, and a small amount of an oil miscible wetting agent for the dye, the amount of dye being in excess of that which is in solution in the water and the organic solvent.

ROBERT F. WALKER.
HENRY W. GUTSCHMIDT, Jr.
WILBUR A. SHOPE.